Patented Mar. 4, 1941

2,233,583

UNITED STATES PATENT OFFICE 2,233,583

MONOAZO DYESTUFFS

Wilfrid Herbert Cliffe and Arthur Howard Knight, Blackley, Manchester, England, assignors to Imperial Chemical Industries Limited, a corporation of Great Britain No Drawing. Application May 18, 1938, Serial No. 208,708. In Great Britain May 26, 1937

9 Claims. (Cl. 260—162)

This invention relates to the manufacture of valuable monoazo dyestuffs for the coloring of animal fibers such as wool.

It is known (see British specification No. 14700/13), to make monoazo dyestuffs by combining diazo compounds of aromatic amines of the formula:

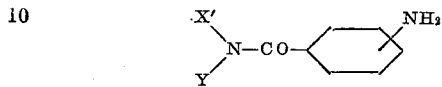

wherein X' is ethyl and Y is an aryl radical of the benzene or naphthalene series), with the sulfonic acids of azo dyestuff components, but these colors are lacking in washing and milling fastness. British specification No. 462,940 describes inter alia the manufacture of monoazo dyestuffs by combining the diazo compounds of aromatic amines of the following formula:

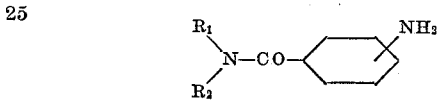

(wherein $R_1$ can be an alkyl radical and $R_2$ an aromatic radical) with N-acylated derivatives of peri-amino-naphthol-disulfonic acids containing an aryl-oxy fatty acid radical, $R_1$, as alkyl, being exemplified by methyl, ethyl, n-butyl, isobutyl, isoamyl, and isohexyl, but these colors lack washing fastness.

It is an object of the invention to produce dyes similar to those described in the identified British patents but superior in washing and milling fastness to the colors of the first of said patents and superior in washing fastness to the colors of the second of said patents.

According to the present invention we manufacture the new dyestuffs by combining the diazo compounds of aromatic amines of the general formula:

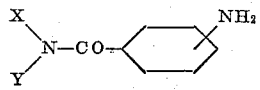

wherein X means a long chain aliphatic hydrocarbon radical of at least 10, not more than 20 carbon atoms (and preferably 10 to 16 carbon atoms), and Y means an aryl radical of the benzene series, with coupling components devoid of long chain aliphatic hydrocarbon radicals and which are naphthol-di- or tri-sulfonic acids, N-acidyl-1:8-amino-naphthol-disulfonic acids or sulfo-aryl-pyrazolones.

The dyes of the present invention are distinguished from the known ones mentioned in the first said patent by yielding wool dyeings of superior fastness to severe washing and milling. The analogous dyestuffs of the present invention are superior to the known dyestuffs of British specification No. 462,940 in fastness to severe washing.

The diazo components employed according to the present invention may be obtained for example by condensing the corresponding secondary amines with a nitro-aroyl chloride and reducing the condensation products obtained. The new dyestuffs obtained according to the present invention yield shades on wool ranging from yellow to orange to bluish red. They can be conveniently applied to the fiber from a dyebath containing 2% ammonium acetate. The colorations are characterized by possessing excellent fastness to severe washing and milling and very good light fastness.

The invention is illustrated but not limited by the following examples in which the parts are by weight.

Example I

A mixture of 38 parts of 3-aminobenz-N-dodecyl-anilide, (m. p. 63° C.), 500 parts of water and 25 parts of 36% hydrochloric acid is heated to 80° C. and then cooled to 15° C. with stirring. The base is then diazotized by the addition of 6.9 parts of sodium nitrite, the diazo compound being obtained in solution. The diazo solution, after filtration if necessary, is then cooled to 5° C. and added to a similarly cooled solution of 30.4 parts of 2-naphthol-6:8-disulfonic acid in 400 parts of water containing sufficient sodium carbonate to keep the coupling alkaline to litmus. When coupling is complete the dyestuff is isolated by adding 5% sodium chloride (weight for volume), filtering and drying.

The new dyestuff forms a bright orange powder, which dissolves in water to a yellowish solution. It dyes wool from an acid bath or from a bath containing 2% of ammonium acetate in yellowish-orange shades of excellent fastness to severe washing, milling, and light.

Example II

A fine suspension of 38 parts of 4-aminobenz-N-dodecyl-anilide (m. p. 69° C.) in a mixture of 350 parts of water and 25 parts of 36% hydrochloric acid is diazotized by adding 6.9 parts of sodium nitrite. The diazo solution so obtained is filtered if necessary and added to a cooled solution (5° C.) of 25.4 parts of 1-(4'-sulfophenyl)-3-methyl-5-pyrazolone in 400 parts of water containing sufficient sodium carbonate to keep the coupling mixture alkaline to litmus. The dyestuff is isolated as in Example I. It forms a yellow powder which dissolves in water to a yellow solution, and dyes wool in pure yellow shades of excellent fastness to severe washing, milling, and light when applied as in Example I.

If, in the above example, instead of 25.4 parts of 1-(4'-sulfophenyl)-3-methyl-5-pyrazolone there are used 32.3 parts of 1-(2':5'-dichloro-4'-sulfophenyl)-3-methyl-5-pyrazolone, the resulting dyestuff dyes wool in greener shades of yellow of similar fastness properties.

Example III 38 parts of 4-aminobenz-N-dodecyl-anilide are diazotized as in Example II and the solution of the diazo compound so obtained is added to a cold solution of 36.1 parts of 1-acetyl-amino-8-naphthol-3:6-disulfonic acid in 500 parts of water containing sufficient sodium carbonate to keep the coupling mixture alkaline to litmus. The new dyestuff is filtered off and dried. It forms a red-brown powder, soluble in water to a red solution, and dyes wool in bluish-red shades of very good fastness to severe washing and milling and good fastness to light.

Example IV 38 parts of 3-amino-benz-N-dodecyl-anilide are diazotized as in Example I and the solution of the diazo compound so obtained is added to a cold solution of 49 parts of 1-(2'-chlorophenoxy-acetyl-amino)-8-naphthol-4:6-disulfonic acid in 600 parts of water containing sufficient sodium carbonate to keep the coupling mixture alkaline to litmus. The new dyestuff forms a reddish powder, soluble in hot water to a red solution, and dyes wool in scarlet shades of very good fastness to severe washing and milling, and good fastness to light.

If in the above example instead of 38 parts of 3-aminobenz-N-dodecylanilide there are used 39.4 parts of 4-aminobenz-N-dodecyl-2'-toluidide a dyestuff is obtained which yields rather redder shades on wool of the same good fastness properties.

Example V

A finely divided suspension of 45.1 parts of the hydrochloride of 4-aminobenz-N-dodecyl-2'-chloro-anilide in 400 parts of water containing 15 parts of 36% hydrochloric acid is diazotized by the addition of 6.9 parts of sodium nitrite. The solution of the diazo compound, after filtration if necessary, is cooled to 5-10° C. and added to a cooled aqueous solution of 30.4 parts of 1-naphthol-3:6-disulfonic acid containing excess of sodium carbonate. Coupling is rapid. The new dyestuff is isolated by the addition of 5% common salt (weight for volume), filtering, and drying. It dyes wool in reddish-orange shades of very good fastness to severe washing and milling.

If in the above example instead of 30.4 parts of 1-naphthol-3:6-disulfonic acid there are employed 32.3 parts of 1-(2':5'-dichloro-4'-sulfophenyl)-3-methyl-5-pyrazolone a dyestuff is obtained which dyes wool in greenish-yellow shades of very good fastness to severe washing, milling, and light.

Example VI

A finely divided suspension of 47.3 parts of the hydrochloride of 3-aminobenz-N-cetyl-anilide in 350 parts of water containing 15 parts of 36% hydrochloric acid is diazotized by the addition of 6.9 parts of sodium nitrite. The suspension of the diazo compound so obtained is cooled to 5°-10° C. and added to a cooled aqueous solution of 38.4 parts of 1-naphthol-3:6:8-trisulfonic acid containing excess of sodium carbonate. The new dyestuff is filtered off and dried. It dyes wool in orange-brown shades of very good fastness to severe washing, milling and light.

Example VII 41 parts of 3-amino-4-methoxybenz-N-dodecyl-anilide are suspended in 450 parts of water containing 25 parts of 36% hydrochloric acid. The suspension is heated to 75° C. and the thick syrup so obtained then cooled to 25° C., 7.0 parts of sodium nitrite are then added, the diazo compound thereby formed remaining in solution. This solution is cooled to 5-10° C. and added to a cooled aqueous solution of 47.3 parts of 1-p-toluene-sulfonyl-amino-8-naphthol-3:6-disulfonic acid containing sufficient sodium carbonate to keep the coupling mixture alkaline to litmus during the addition. The new dyestuff is filtered off and dried. It dyes wool in very bluish-red shades of very good fastness to severe washing, milling, and light when applied from a dyebath containing 2% ammonium acetate.

Example VIII 39.4 parts of 3-amino-4-methylbenz-N-dodecyl-anilide are suspended in 500 parts of water containing 25 parts of 36% hydrochloric acid. The suspension is heated to 75° C. and the thick syrup thus obtained cooled to 20-25° C. 7 parts of sodium nitrite are then added, the diazo compound thereby formed remaining in solution. This solution is cooled to 5-10° C. and added to a cooled aqueous solution of 30.4 parts of 1-naphthol-3:8-disulfonic acid containing excess of sodium carbonate. The new dyestuff is isolated by adding 5% common salt (weight for volume), filtering and drying. It dyes wool in reddish-orange shades of excellent fastness to severe washing and milling.

The invention is further illustrated by the examples listed in the following table:

| Example number | Diazo component | Coupling component | Shade on wool |
|---|---|---|---|
| 9 | 3-aminobenz-N-dodecyl-anilide | 1-(2':5'-dichloro-4'-sulfophenyl)-3-methyl-5-pyrazolone. | Greenish-yellow. |
| 10 | 3-amino-4-methoxybenz-N-dodecyl-anilide. | ____do____ | Yellow. |
| 11 | 3-aminobenz-N-dodecyl-anilide | 1-(4'-sulfophenyl)-3-methyl-5-pyrazolone | Yellow. |
| 12 | 3-amino-4-methoxybenz-N-dodecyl-anilide | 1-(4'-sulfophenyl)-3-methyl-5-pyrazolone | Reddish-yellow. |
| 13 | 4-aminobenz-N-dodecyl-2'-chloro-anilide. | ____do____ | Yellow. |
| 14 | 3-aminobenz-N-dodecyl-anilide | 1-naphthol-3:6:8-trisulfonic acid | Reddish-orange. |
| 15 | 4-aminobenz-N-dodecyl-anilide | 1-naphthol-3:6:8-trisulfonic acid | Yellowish-scarlet. |
| 16 | 3-aminobenz-N-octadecyl-anilide | ____do____ | Reddish-orange. |
| 17 | 4-aminobenz-N-dodecyl-anilide | 2-naphthol-6:8-disulfonic acid | Yellowish-orange. |
| 18 | 4-aminobenz-N-dodecyl-2'-chloro-anilide | ____do____ | Do. |
| 19 | 4-aminobenz-N-dodecyl-anilide | 2-naphthol-3:6-disulfonic acid | Reddish-orange. |
| 20 | 3-aminobenz-N-dodecyl-anilide | 1-naphthol-3:6-disulfonic acid | Orange-brown. |
| 21 | 4-aminobenz-N-dodecyl-anilide | 1-naphthol-3:8-disulfonic acid | Reddish-orange. |
| 22 | 3-amino-4-methoxybenz-N-dodecyl-anilide. | 1-naphthol-3:6-disulfonic acid | Scarlet. |
| 23 | 4-aminobenz-N-dodecyl-anilide | 1-acetyl-amino-8-naphthol-4:6-disulfonic acid | Yellowish-red. |
| 24 | 4-aminobenz-N-dodecyl-anilide | 1-benzoylamino-8-naphthol-3:6-disulfonic acid | Bluish-red. |
| 25 | ____do____ | 1-p-toluene-sulfonyl-amino-8-naphthol-3:6-disulfonic acid. | Red. |
| 26 | 3-amino-4-methoxybenz-N-dodecyl-anilide. | 1-acetylamino-8-naphthol-3:6-disulfonic acid | Dull red. |
| 27 | 3-amino-4-methylbenz-N-dodecyl-anilide. | ____do____ | Bright red. |
| 28 | 4-aminobenz-N-dodecyl-2'-toluidide | 1-phenoxy-acetyl-amino-8-naphthol-3:6-disulfonic acid | Very bluish red. |
| 29 | 4-aminobenz-N-dodecyl-2'-chloro-anilide. | 1-acetylamino-8-naphthol-3:6-disulfonic acid | Red. |
| 30 | 3-aminobenz-N-cetylanilide | ____do____ | Yellowish-red. |
| 31 | 3-aminobenz-N-octadecyl-anilide | 1-propionylamino-8-naphthol-3:6-disulfonic acid. | Red. |
| 32 | 4-aminobenz-N-dodecyl-anilide | 1-(2'-chlorophenoxy-acetylamino)-8-naphthol-4:6-disulfonic acid. | Yellowish-red. |
| 33 | 4-aminobenz-N-dodecyl-anilide | 1-(4'-sulfophenyl)-5-pyrazolone-3-carboxylic acid. | Reddish-yellow. |
| 34 | ____do____ | 1-benzoylamino-8-naphthol-4:6-disulfonic acid | Bluish-red. |

As many apparently widely different embodiments of this invention may be made without departing from the spirit and scope thereof, it is to be understood that we do not limit ourselves to the specific embodiments thereof except as defined in the appended claims.

We claim:

1. Dyestuffs represented by the formula:

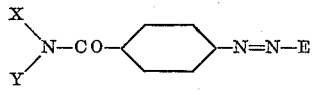

in which X is a long chain aliphatic hydrocarbon radical having 10-20 carbon atoms, Y is a radical of the benzene series, and E is a component devoid of long chain aliphatic hydrocarbon radicals and from the group consisting of naphthol-disulfonic acids, naphthol-trisulfonic acids, N-acidyl-1:8-amino-naphthol-disulfonic acids, and sulfo-aryl-pyrazolones.

2. The compounds of claim 1 in which X has from 10 to 16 carbon atoms.

3. Dyestuffs represented by the formula

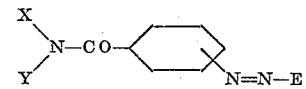

in which E is the radical of a 1-sulfo-phenyl-3-methyl-5-pyrazolone, X is a dodecyl radical, and Y is an aryl radical of the benzene series.

4. Dyestuffs represented by the formula:

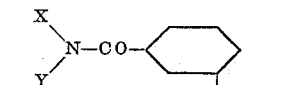

in which E is the radical of a 1-sulfo-phenyl-3-methyl-5-pyrazolone, X is a dodecyl radical, and Y is an aryl radical of the benzene series.

5. The compound formed by coupling diazotized 4-aminobenz-N-dodecylanilide with 1-(4'-sulfophenyl)-3-methyl-5-pyrazolone.

6. The compound formed by coupling diazotized 3-amino-4-methoxybenz-N-dodecylanilide with 1-p-toluene-sulfonyl-amino-8-naphthol-3:6-disulfonic acid.

7. The compound formed by coupling diazotized 3-amino-4-methylbenz-N-dodecylanilide with 1-naphthol-3:8-disulfonic acid.

8. Process for the manufacture of new monoazo dyestuffs by coupling diazotized aromatic amines of the general formula:

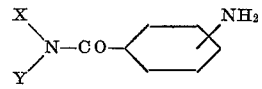

wherein X means a long chain aliphatic hydrocarbon radical of at least 10, and not more than 20 carbon atoms and Y means an aryl radical of the benzene series, with coupling components devoid of long chain aliphatic hydrocarbon radicals and which are from the class consisting of naphthol-di- or tri-sulfonic acids, and N-acidyl-1:8-amino-naphthol-disulfonic acids or sulfo-aryl-pyrazolones.

9. The compounds of claim 8 in which X has from 10 to 16 carbon atoms.

WILFRID HERBERT CLIFFE.
ARTHUR HOWARD KNIGHT.